July 29, 1924.
A. W. OJERHOLM
1,503,206
COMBINATION VALVE GRINDER AND DRILL
Original Filed Nov. 29, 1920
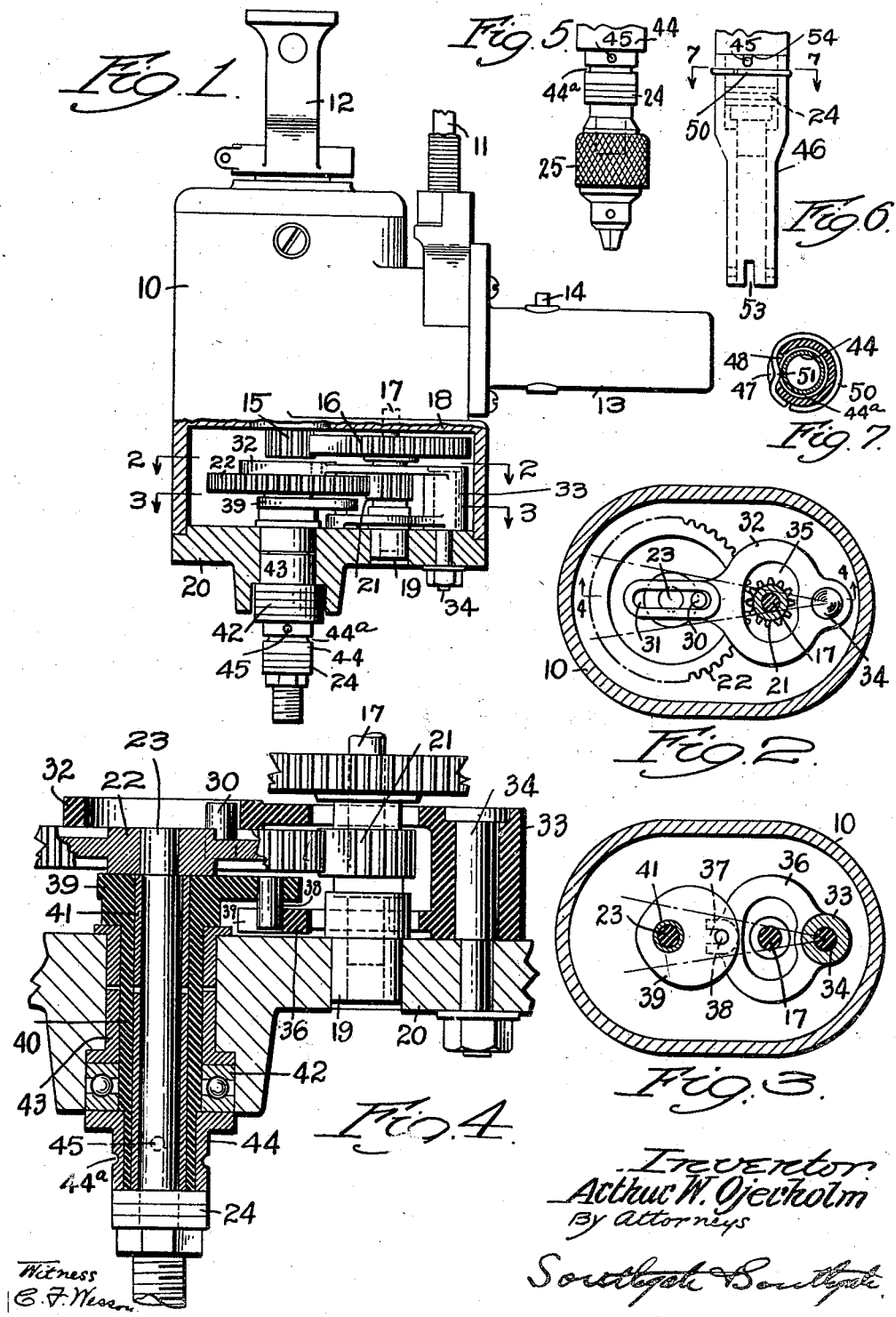

Patented July 29, 1924.

1,503,206

UNITED STATES PATENT OFFICE.

ARTHUR W. OJERHOLM, OF WORCESTER, MASSACHUSETTS, ASSIGNOR, BY MESNE ASSIGNMENTS, TO WORCESTER ELECTRIC TOOL COMPANY, A CORPORATION OF MASSACHUSETTS.

COMBINATION VALVE GRINDER AND DRILL.

Application filed November 29, 1920, Serial No. 426,993. Renewed December 21, 1923.

*To all whom it may concern:*

Be it known that I, ARTHUR W. OJERHOLM, a citizen of the United States, residing at Worcester, in the county of Worcester and State of Massachusetts, have invented a new and useful Combination Valve Grinder and Drill, of which the following is a specification.

This invention relates to that class of portable tools which can be used for transmitting power either in the form of rotation or oscillation and includes a casing for containing the motor and power transmission mechanism.

The principal objects of the invention are to provide an improved and simplified mechanism for transmitting power from the motor shaft either in the form of rotation or oscillation, and to provide this mechanism in such form that it can be contained in a very small space, thus reducing the size and expense of the whole tool, and to provide an improved and simplified way of mounting on the spindle either of two kinds of chucks.

Reference is to be had with the accompanying drawings in which

Fig. 1 is a side view of a preferred embodiment of the invention showing the lower part of the casing in section along a central plane;

Figs. 2 and 3 are horizontal sectional views on the lines 2—2 and 3—3 respectively of Fig. 1;

Fig. 4 is an enlarged central sectional view of the gearing and associated parts shown in Fig. 1;

Fig. 5 is an elevation of a drill head adapted to be used on this machine;

Fig. 6 is a similar view of a head or chuck for holding a valve grinding tool; and Fig. 7 is a sectional view on the line 7—7 of Fig. 6.

The invention is shown in a form in which it involves a casing 10 which contains a motor adapted to be fed through a flexible electric cable 11. This casing is provided at the top with a handle 12 for one hand and with a detachable side wall having a projection 13 constituting a handle for the other hand, preferably the right hand. This handle 13 is provided with a plunger 14 which by means, not shown, operates a switch inside for connecting and disconnecting the electric current through the cable 11. The motor in this casing is not illustrated as any desired kind of an electric motor can be used.

The motor is provided with a shaft for transmitting power. This shaft is centrally located and on the end of it is mounted a pinion or small gear 15. This meshes with a larger gear 16 and therefore transmits power at a lower rate of speed to its shaft 17 which is parallel with the motor shaft. This shaft 17 is provided with a bearing in a partition 18 across the lower part of the casing and with a lower bearing 19 in the removable bottom or end wall 20 which closes that end of the casing.

The shaft 17 is provided with a pinion 21 which drives a larger gear 22 on a spindle 23 located centrally in alignment with the motor shaft. It will be seen therefore that this spindle 23 is rotated at a lower speed than the shaft 17, further decreasing the speed. It is provided with a thrust ball bearing 24 near its lower end. A chuck 25 for holding a drill or other rotary tool is adapted to be screwed to its end below this ball bearing. This is the arrangement for driving the drill.

On the gear 22 is located a pin 30 at a distance from its center. This pin therefore rotates in a circular orbit. This pin projects into a radial slot 31 in an arm 32. Therefore, the rotation of the gear 22 moves this arm back and forth. As the arm is provided with a hub 33 pivoted on a stud 34 fixed on the bottom plate 20, the motion of this arm 32 will be a motion of oscillation about this stud. This arm is provided with an arcuate opening 35 for the shaft 17. On the bottom of this hub is another arm 36. As the two arms 32 and 36 are both fixed to, or a part of, the same hub 33 this arm 36 will oscillate about the stud 34 as a center while the spindle 23 is rotated. The arm 36 is provided at its end with a notch 37 which receives a pin 38 on an arm or disc 39 extending from a hollow spindle 40. This spindle is centered on the spindle 23 by bushings 41 or the like. Therefore the spindle 40 will oscillate on its axis as the spindle 23 rotates.

The spindle 40 is provided with a thrust ball bearing 42 and is centered in a bushing 43 on the bottom plate 20. Below, it is provided with a collar 44. A pin 45 causes the collar 44 to oscillate with the spindle 40.

On this collar 44 there is a groove 44ª extending all the way around it. It is shaped to receive a valve grinding tool chuck 46. This is provided with a groove 47 having an opening at 48 extending entirely through its wall. In the groove 47 is located a wire spring 50 of circular form but having an inward offset 51. This spring is of tempered or resilient wire and when inserted in this groove and turned the offset 51 will project inwardly through the opening 48 into the groove 45 and hold these parts together. The chuck 46 is thus held in position on the collar 44. It is provided with a notch 53 at the bottom by which a valve grinding tool can be secured to it and a notch 54 for the end of the pin 45.

It will be seen therefore that by this invention the means for transmitting a continuous rotary motion to the drill spindle 23 is of simple character and is no different from that which would be employed if the machine were to be used for drilling only. The mechanism for simultaneously transmitting an oscillating motion to the collar 44 and the hollow spindle is of exceedingly simple character involving only one important extra part. It is of such a nature that this mechanism can be contained in a very small space, not materially enlarging the casing that would be required for the drilling mechanism alone. It is also positive and of such a nature as to avoid any complication due to dead centers, and it is inexpensive to manufacture and assemble. By providing two concentric spindles one always oscillating and the other always rotating, the necessity of providing mechanism to shift from one to the other is avoided.

Although I have illustrated and described only a single form of the invention I am aware of the fact that modifications can be made therein by any person skilled in the art without departing from the scope of the invention as expressed in the claims. Therefore, I do not wish to be limited to all the details of construction herein shown and described but what I do claim is:—

1. In a combination drill and valve grinder, the combination with a motor and a driving spindle, of a gear on the driving spindle, means for transmitting power to the gear at a reduced speed but in a constant direction, a connecting member mounted closely adjacent to said means projecting between the parts of said power transmitting means and connected to the gear to be oscillated thereby, and a hollow spindle connected with said connecting member to be oscillated thereby, said hollow spindle having means by which a valve grinder chuck can be secured thereto, the first named spindle having means by which a drill chuck can be secured to it.

2. In a combination drill and valve grinder, the combination with a motor shaft having a pinion on the end thereof and a driving spindle, of means for transmitting power from the pinion to the spindle at a reduced speed but in a constant direction, a connecting member mounted closely adjacent to said means provided with an arm projecting between the parts of said power transmitting means and connected to be oscillated thereby, a hollow spindle mounted on the first named spindle and connected with said connecting member to be oscillated thereby, and a collar fixed to said hollow spindle to which a valve grinder chuck can be secured, the first named spindle having means by which a drill chuck can be secured to it.

3. In a portable drill having a casing and self contained motor, the combination of a set of gearing for transmitting the power from the motor at reduced speed, and a drill spindle connected to said gearing and having means projecting from the casing for receiving a drill chuck, with a hub pivoted on an axis parallel with the drill spindle having two parallel arms projecting therefrom, a rotary pin in said gearing for engaging one of said arms and oscillating it as the gearing rotates, a spindle centered on said drill spindle and having an arm projecting therefrom, means connected with the other arm of said oscillatable member for oscillating the last named arm and spindle, and means on the last named spindle beyond the casing adapted to receive a chuck for holding and operating a valve grinding tool.

4. In a portable tool, the combination of a motor, a pinion mounted on the motor shaft, a shaft parallel with said shaft, a gear on said shaft meshing with said pinion for receiving power from the motor, a pinion on said shaft spaced from said gear, a spindle in alignment with the motor shaft but spaced therefrom, a gear thereon meshing with the last named pinion whereby power will be transmitted from the first named pinion to the spindle at reduced speed, the last named gear having a projection mounted thereon at a distance from the center, a hub mounted on an axis parallel with said shaft and having two parallel arms projecting therefrom, one of said arms extending into the space between said gear and pinion and having a radial slot into which said projection engages, whereby said hub and arms are oscillated by the projection, and a hollow spindle freely mounted on the first named spindle and supported by the casing and having an arm projecting therefrom and engaging the second arm of said hub for receiving a motion of oscillation therefrom.

5. In a portable tool, the combination of a shaft, a gear on said shaft for receiving power from the motor, a pinion on said shaft spaced from said gear, a spindle, a gear thereon meshing with the last named pinion, the last named gear having a projection mounted thereon at a distance from the center, a hub mounted on an axis parallel with said shaft and having two parallel arms projecting therefrom, one of said arms extending into the space between said gear and pinion and having a radial slot into which said projection engages, and a spindle freely mounted and having an arm projecting therefrom and engaging the second arm of said hub for receiving a motion of oscillation therefrom.

6. In a portable motor driven tool of the character described, the combination of a motor casing having a detachable end plate provided with a bearing, a hollow spindle oscillately mounted in said bearing, an inner spindle projecting through the hollow spindle, means for constantly rotating the inner spindle, means for oscillating the hollow spindle from the same source of power, a collar on the hollow spindle below said plate, a thrust ball bearing on the plate for supporting said hollow spindle, a thrust ball bearing carried by the inner spindle and engaging the end of the collar, means on the end of the inner spindle for receiving a drill chuck, said collar having a groove thereon, a valve grinder chuck provided with a groove in its wall, and a perforation through the wall, a resilient wire in last named groove provided with an inward offset extending through said perforation into the groove in the collar, whereby when said chuck is forced over said collar, the offset in the spring will enter the perforation and inner groove and hold the chuck fixed on the collar to rotate therewith.

7. In a combination drill and valve grinder, the combination with a motor shaft having a pinion on the end thereof and a driving spindle, of means for transmitting power from the pinion to the spindle at a reduced speed but in a constant direction, a connecting member mounted closely adjacent to said means provided with two arms projecting between the parts of said power transmitting means and connected to be oscillated thereby, and a spindle mounted on the first named spindle and connected with said connecting member to be oscillated thereby.

In testimony whereof I have hereunto affixed my signature.

ARTHUR W. OJERHOLM.